United States Patent Office 3,355,457
Patented Nov. 28, 1967

3,355,457
SUBSTITUTED 2-IMIDAZOLINONES
William Blythe Wright, Jr., Woodcliff Lake, N.J., and Herbert Joseph Brabander, Nanuet, N.Y., assignors to American Cyanamid Company, Stamford, Conn., a corporation of Maine
No Drawing. Filed May 21, 1965, Ser. No. 457,816
12 Claims. (Cl. 260—309.6)

This invention relates to new organic compounds. More particularly, the invention relates to new 2-imidazolinones and intermediates thereof and to processes of preparing the same.

The novel compounds of this invention may be illustrated by the following formula:

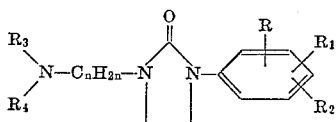

wherein R, $R_1$, and $R_2$ are members of the group consisting of hydrogen, halogen, lower alkyl, lower alkoxy, nitro and trifluoromethyl and $R_1$ and $R_2$ when on adjacent carbon atoms may represent the methylenedioxy group; $R_3$ and $R_4$ are members of the group consisting of lower alkyl, mononuclear ar(lower)alkyl, and when taken together with the nitrogen are pyrrolidino, lower alkylpyrrolidino, piperidino, lower alkylpiperidino, morpholino, lower alkylmorpholino, hexamethyleneimino, lower alkylpiperazinyl and phenylpiperazinyl; $n$ is an integer from 2 to 4 and acid addition salts.

The free bases of this invention may be liquids or solids at room temperature. They are, in general, relatively insoluble in water, but soluble in most organic solvents such as lower alkyl alcohols and esters, acetone, chloroform, and the like. These compounds form acid addition salts with acids such as hydrochloric acid, sulfuric acid, maleic acid, fumaric acid and the like; and such salts are, in general, soluble in water, methanol, and ethanol, but relatively insoluble in benzene, ether, petroleum ether and the like.

The compounds of this invention may be prepared by the following method which involves the cyclization of an appropriate 1-(tert-aminoalkyl)-3-phenylureidoacetaldehyde diethylacetal derivative.

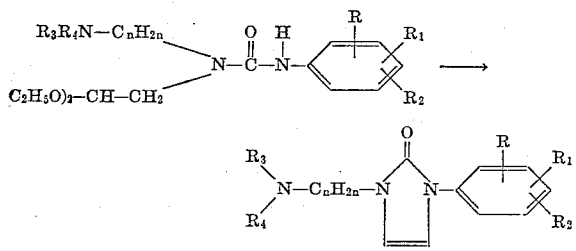

The cyclization occurs easily and in good yield when the derivative of the appropriate 1-(tert-aminoalkyl)-3-phenylureidoacetaldehyde diethylacetal is heated at 80° C. with ethanolic hydrochloric acid for about two to four hours. However, the reaction is not limited to this acid alone and cyclization also may be carried out with other acids and solvents. Further the reaction is not limited to the time and temperature specified which represents the optimum conditions.

The present compounds are valuable chemical intermediates for the preparation of the saturated analogs described and claimed in our copending application Ser. No. 227,078 filed Sept. 28, 1962, now U.S. Patent 3,196,152.

The 2-imidazolinones are chemical intermediates for the preparation of 2-imidazolidinone derivatives, compounds which have potent tranquilizer activity and are prepared by the method illustrated in the following equation:

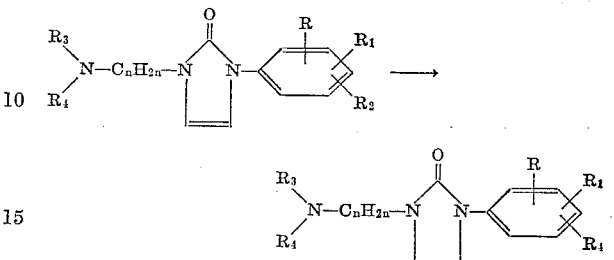

wherein R, $R_1$, $R_2$, $R_3$, $R_4$ and $n$ are as hereinbefore described. This conversion may be carried out by catalytic hydrogenation using palladium, platinum, nickel or other metal catalysts. The reaction may also be carried out by electrolytic reduction or by use of other suitable reducing agents such as diborane and the like. The desired products are easily isolated as the free bases or as suitable salts.

Among the compounds of the present invention 1-(2-dimethylaminoethyl)-3-phenyl-2-imidazolinone; 1-(2-dimethylaminoethyl) - 3 - (3,4-methylenedioxyphenyl) - 2-imidazolinone; 1 - (2-dimethylaminoethyl) - 3 - (m-nitrophenyl)-2-imidazolinone and 1-(m-chlorophenyl)-3-(3-dimethylaminopropyl)-2-imidazolinone have been found active against the phenyl-p-quinone "writhing" syndrone in mice. The testing procedure used was that reported by Vander Wender and Margolin, Fed. Proc. 15, 494 (1956) as a method for testing analgesics which has been modified by Siegmund et al., Proc. Soc. Exp. Biol. Med. 95, 729 (1957). Among the known analgesics which exhibit efficacy in blocking this response are, for example, acetylsalicyclic acid, phenacetin, phenyl butazone, meperidine, morphine and the like.

The following specific examples illustrate the preparation of representative compounds of the present invention. Parts are by weight unless otherwise indicated.

EXAMPLE 1

*Preparation of 1-(2-dimethylaminoethyl)-3-phenyl-ureidoacetaldehyde diethylacetal*

A solution of 10.6 parts of dimethylaminoethylaminoacetaldehyde diethylacetal in 25 parts of hexane is added dropwise with stirring to a solution of 6.2 parts of phenylisocyanate in 25 parts of hexane. The mixture is stirred without external heat for one hour and then heated at reflux temperature for one half hour. The solvent is removed by distillation under reduced pressure. The viscous oil which remains is essentially pure 1-(2-dimethylaminoethyl)-3-phenylureidoacetaldehyde diethylacetal, and is obtained in nearly quantitative yield, $n_D^{26}$ 1.5128.

EXAMPLE 2

*Preparation of 3-(m-chlorophenyl)-1-(2-dimethylaminoethyl)ureidoacetaldehyde diethylacetal*

Following the procedure of Example 1 and reacting dimethylaminoethylaminoacetaldehyde diethylacetal with m-chloropnenylisocyanate the product, 3-(m-chlorophenyl)-1-(2-dimethylaminoethyl)ureidoacetaldehyde diethylacetal, $n_D^{26}$ 1.5168 is obtained.

EXAMPLE 3

*Preparation of 3-(p-chlorophenyl)-1-(2-dimethylaminoethyl)ureidoacetaldehyde diethylacetal*

Using the procedure of Example 1 and reacting dimethylaminoethylaminoacetaldehyde diethylacetal with p-chlorophenyl isocyanate the product, 3-(p-chlorophenyl)-1-(2-dimethylaminoethyl)ureidoacetaldehyde diethylacetal, $n_D^{26}$ 1.5228, is obtained.

EXAMPLE 4

*Preparation of 1-(2-dimethylaminoethyl)-3-(p-fluorophenyl)ureidoacetaldehyde diethylacetal*

When the procedure of Example 1 is used and dimethylaminoethylaminoacetaldehyde diethylacetal is reacted with p-fluorophenylisocyanate, the product, 1-(2-dimethylaminoethyl)-3-(p-fluorophenyl)ureidoacetaldehyde diethylacetal, is obtained.

EXAMPLE 5

*Preparation of 1-(2-dimethylaminoethyl)-3-(m-nitrophenyl)-ureidoacetaldehyde diethylacetal*

Using the procedure described in Example 1 and reacting dimethylaminoethylaminoacetaldehyde diethylacetal and m-nitrophenylisocyanate the product 1-(2-dimethylaminoethyl) - 3 - (m-nitrophenyl)ureidoacetaldehyde diethylacetal, $n_D^{26}$ 1.5289, is obtained.

EXAMPLE 6

*Preparation of 1-(2-dimethylaminoethyl)-3-(3,4-dimethoxyphenyl)ureidoacetaldehyde diethylacetal*

Using the procedure of Example 1 and reacting dimethylaminoethylaminoacetaldehyde diethylacetal with 3,4-dimethoxyphenylisocyanate the product 1 - (2 - dimethylaminoethyl)-3 - (3,4 - dimethoxyphenyl)ureidoacetaldehyde diethylacetal, is obtained.

EXAMPLE 7

*Preparation of 1-(2-dimethylaminoethyl)-3-(3,4,5-trimethoxyphenyl)ureidoacetaldehyde diethylacetal*

Following the procedure outlined in Example 1 and reacting dimethylaminoethylaminoacetaldehyde diethylacetal with 3,4,5-trimethoxyphenylisocyanate the product 1-(2-dimethylaminoethyl)-3 - (3,4,5 - trimethoxyphenyl)ureidoacetaldehyde diethylacetal, $n_D^{26}$ 1.5225, is obtained.

EXAMPLE 8

*Preparation of 1-(2-dimethylaminoethyl)-3-(3,4-methylenedioxyphenyl)ureidoacetaldehyde diethylacetal*

When dimethylaminoethylaminoacetaldehyde diethylacetal is reacted with 3,4-methylenedioxyphenylisocyanate by the procedure outlined in Example 1 the product obtained is 1-(2-dimethylaminoethyl)-3-(3,4 - methylenedioxyphenyl)ureidoacetaldehyde diethylacetal.

EXAMPLE 9

*Preparation of 3-(m-chlorophenyl)-1-(3-dimethylaminopropyl)-ureidoacetaldehyde diethylacetal*

Using the procedure of Example 1 and reacting dimethylaminopropylaminoacetaldehyde diethylacetal and m-chlorophenylisocyanate the following product is obtained, 3-(m-chlorophenyl)-1-(3 - dimethylaminopropyl)ureidoacetaldehyde diethylacetal, $n_D^{26}$ 1.5190.

EXAMPLE 10

*Preparation of 3-(m-chlorophenyl)-1-(2-dimethylaminoethyl)-2-imidazolinone hydrochloride*

A mixture of 18 parts of 3-(m-chlorophenyl)-1-(2-dimethylaminoethyl)ureidoacetaldehyde diethylacetal (Example 2), 30 parts of ethanol and 60 parts of 2 N ethanolic hydrogen chloride is allowed to reflux for 2 hours and then concentrated to remove the solvent. The residue is made basic by the addition of dilute sodium hydroxide and the aqueous layer is extracted with benzene. The benzene layer is dried over magnesium sulfate and concentrated to a crystalline residue, which is triturated with hexane and filtered off. This product is further purified by recrystallization from ethyl acetate by addition of hexane. Pure 3-(m-chlorophenyl)-1-(2 - dimethylaminoethyl) - 2 - imidazolinone is recovered, melting point 61°–62° C.

The hydrochloride salt, melting point 170°–171° C., is obtained when the free base is dissolved in benzene or ether and reacted with ethanolic hydrogen chloride. Final purification is by crystallization from ethanol or ethanol by addition of ether.

EXAMPLE 11

*Preparation of 1(2-dimethylaminoethyl)-3-(m-methylphenyl)-2-imidazolinone*

When 1-(2-diethylaminoethyl)-3 - (m-methylphenyl) ureidoacetaldehyde diethylacetal, prepared as described hereinbefore, is cyclized by the procedure of Example 10, 1-(2-diethylaminoethyl)-3-(m-methylphenyl)-2 - imidazolinone is obtained.

EXAMPLE 12

*Preparation of 3-(m-bromophenyl)-1-(2-pyrrolidinoethyl)-2-imidazolinone*

If 3-(m-bromophenyl)-1-(2-pyrrolidinoethyl) - ureidoacetaldehyde diethylacetal, prepared as described hereinbefore, is heated with ethanolic hydrogen chloride as described in Example 10, 3-(m-bromophenyl)-1-(2-pyrrolidinoethyl)-2-imidazolinone is obtained.

EXAMPLE 13

*Preparation of 1-(2-dimethylaminoethyl)-3-phenyl-2-imidazolinone hydrochloride*

Following the procedure of Example 10 and cyclizing the compound 1-(2-dimethylaminoethyl)-3-phenylureidoacetaldehyde diethylacetal (Example 1) the following compound is obtained, 1-(2-dimethylaminoethyl)-3-phenyl-2-imidazolinone hydrochloride, melting point 173°–174° C.

EXAMPLE 14

*Preparation of 3-(o-chlorophenyl)-1-(2-piperidinoethyl)-2-imidazolinone*

Using the procedure of Example 10 and reacting 3-(o-chlorophenyl)-1-(2 - piperidinoethyl)ureidoacetaldehyde diethylacetal, prepared as described hereinbefore, 3-(o-chlorophenyl)-1-(2-piperidinoethyl)-2 - imidazolinone is obtained.

EXAMPLE 15

*Preparation of 3-(p-chlorophenyl)-1-(2-dimethylaminoethyl)-2-imidazolinone hydrochloride*

When the procedure of Example 10 is followed and the starting material is 3-(p-chlorophenyl)-1-(2 - dimethylaminoethyl)ureidoacetaldehyde diethylacetal (Example 3) the product resulting is 3-(p-chlorophenyl)-1-(2-dimethylaminoethyl)-2-imidazolinone hydrochloride, melting point 203°–205° C.

EXAMPLE 16

*Preparation of 1-(2-morpholinoethyl)-3-(m-trifluoromethylphenyl)-2-imidazolinone*

When 1-(2-morpholinoethyl) - 3 - (m-trifluoromethylphenyl)ureidoacetaldehyde diethylacetal, prepared as described hereinbefore, is cyclized by the procedure of Example 10, 1-(2-morpholinoethyl)-3 - (m - trifluoromethylphenyl)-2-imidazolinone is obtained.

EXAMPLE 17

*Preparation of 3-(m-chlorophenyl)-1-(2-hexamethyleneiminoethyl)-2-imidazolinone*

If 3-(m-chlorophenyl)-1(2 - hexamethyleneiminoethyl) ureidoacetaldhyde diethylacetal, prepared as described hereinbefore, is heated with ethanolic hydrogen chloride as described in Example 10, 3-(m-chlorophenyl)-1-(2-hexamethyleneiminoethyl)-2-imidazolinone is obtained.

EXAMPLE 18

*Preparation of 1-(2-dimethylaminoethyl)-3-(p-fluorophenyl)-2-imidazolinone hydrochloride*

Using the method described in Example 10 and the compound 1-(2-dimethylaminoethyl)-3-(p-fluorophenyl)-ureidoacetaldehyde diethylacetal (Example 4) the following product is obtained, 1-(2-dimethylaminoethyl)-3-(p-fluorophenyl) - 2 - imidazolinone hydrochloride, melting point 203°–204° C.

EXAMPLE 19

*Preparation of 1-(m-chlorophenyl)-3-[2-(4-methyl-1-piperazinyl)ethyl]-2-imidazolinone*

Using the procedure of Example 10 and reacting 3-(m-chlorophenyl)-1-[2 - (4 - methyl - 1 - piperazinyl) - ethyl] ureidoacetaldehyde diethylacetal, prepared as described hereinbefore, 1-(m-chlorophenyl)-3-[2-(4-methyl-1-piperazinyl)ethyl]-2-imidazolinone is obtained.

EXAMPLE 20

*Preparation of 1-(m-chlorophenyl)-3-[2-(4-phenyl-1-piperazinyl)ethyl]-2-imidazolinone*

Following the procedure of Example 10 and cyclizing compound 3 - (m-chlorophenyl)-1-[2-(4-phenyl-1-piperazinyl)-ethyl]ureidoacetaldehyde diethylacetal, prepared as described hereinbefore, 1 - (m-chlorophenyl)-3-[2-(4-phenyl-1-piperazinyl)ethyl]-2-imidazolinone is obtained.

EXAMPLE 21

*Preparation of 1-(2-dimethylaminoethyl)-3-(m-nitrophenyl)-2-imidazolinone hydrochloride*

Following the procedure outlined in Example 10 and using as starting material 1-(2-dimethylaminoethyl)-3-(m-nitrophenyl)ureidoacetaldehyde diethylacetal (Example 5) the product obtained is 1-(2-dimethylaminoethyl)-3-(m-nitrophenyl)-2-imidazolinone hydrochloride, melting point 213°–215° C.

EXAMPLE 22

*Preparation of 1-(m-chlorophenyl)-3-[2-(methylphenethylamino)ethyl]-2-imidazolinone*

When the procedure of Example 10 is obtained and the starting material is 3-(m-chlorophenyl)-1-[2-(methylphenethylamino)ethyl]ureidoacetaldehyde diethylacetal, prepared as hereinbefore described, the product resulting is 1 - (m - chlorophenyl)-3-[2-(methylphenethylamino)ethyl]-2-imidazolinone.

EXAMPLE 23

*Preparation of 1-(m-chlorophenyl)-3-[2-(2-methylpyrrolidino)-ethyl]-2-imidazolinone*

Using the method described in Example 10 and the starting material 3-(m-chlorophenyl)-1-[2-(2-methylpyrrolidino)ethyl]ureidoacetaldehyde diethylacetal, prepared as hereinbefore described, the compound 1-(m-chlorophenyl) - 3 - [2 - (2 - methylpyrrolidino)ethyl] - 2 - imidazolinone is obtained.

EXAMPLE 24

*Preparation of 1-(3,4-dimethoxyphenyl)-3-(2-dimethylaminoethyl)-2-imidazolinone hydrochloride*

When the procedure of Example 10 is used and the starting material is 1-(2-dimethylaminoethyl)-3-(3,4-dimethoxyphenyl)ureidoacetaldehyde diethylacetal (Example 6) the product obtained is 1-(3,4-dimethoxyphenyl)-3-(2-dimethylaminoethyl)-2-imidazolinone hydrochloride, melting point 169°–170° C.

EXAMPLE 25

*Preparation of 1-(m-chlorophenyl)-3-[2-(2,6-dimethylmorpholino)-ethyl]-2-imidazolinone*

When the procedure of Example 10 is used and the starting material is 3-(m-chlorophenyl)-1-[2-(2,6-dimethylmorpholino)ethyl]ureidoacetaldehyde diethylacetal, prepared as hereinbefore described 1-(m-chlorophenyl)-3-[2-(2,6-dimethylmorpholino)ethyl]-2-imidazolinone is obtained.

EXAMPLE 26

*Preparation of 1-(m-chlorophenyl)-3-[2-(2-methylpiperidino)-ethyl]-2-imidazolinone*

Following the procedure of Example 10 and using as starting material, 3 - (m-chlorophenyl)-1-[2-(2-methylpiperidino)ethyl]ureidoacetaldehyde diethylacetal, prepared as described hereinbefore, 1-(m-chlorophenyl)-3-[2-(2-methylpiperidino)ethyl] - 2 - imidazolinone is obtained.

EXAMPLE 27

*Preparation of 1-(2-dimethylaminoethyl)-3-(3,4,5-trimethoxyphenyl)-2-imidazolinone*

Using the procedure of Example 10 and the starting material 1 - (2-dimethylaminoethyl)-3-(3,4,5-trimethoxyphenyl)ureidoacetaldehyde diethylacetal (Example 7) the product obtained is 1-(2-dimethylaminoethyl)-3-(3,4,5-trimethoxyphenyl)-2-imidazolinone, which in the form of its maleate salt has a melting point of 122°–124° C.

EXAMPLE 28

*Preparation of 1-(m-chlorophenyl)-3-(2-dimethylaminoethyl)-2-imidazolidinone*

A mixture of 3.0 parts of 1-(m-chlorphenyl)-3-(2-dimethylaminoethyl)-2-imidazolinone hydrochloride, 100 parts of 90% ethanol, and 1 part of 10% palladium-on-carbon catalyst is stirred in a hydrogenator until 250 parts by volume of hydrogen is absorbed. The mixture is filtered and the solvent is removed. The residue is mixed with 4.0 parts of 5 N-sodium hydroxide and the organic product is extracted into ether. The ether layer is concentrated and the residue is chromatographed in order to remove pure 1 - (m-chlorophenyl)-3-(2-dimethylaminoethyl)-2-imidazolidinone.

EXAMPLE 29

*Preparation of 1-(2-dimethylaminoethyl)-3-(3,4-methylenedioxyphenyl)-2-imidazolinone hydrochloride*

When the procedure of Example 10 is used and the starting material is 1 - (2-dimethylaminoethyl)-3-(3,4-methylenedioxyphenyl)ureidoacetaldehyde diethylacetal (Example 8) the product obtained is 1-(2-dimethylaminoethyl)-3-(3,4-methylenedioxyphenyl)-2-imidazolinone hydrochloride, melting point 218°–220° C.

EXAMPLE 30

*Preparation of 1-(m-chlorophenyl)-3-(2-dimethylaminoethyl)-2-imidazolidinone*

A solution of 1.33 parts of 1-(m-chlorophenyl)-3-(2-dimethylaminoethyl)-2-imidazolinone in 30 parts of diglyme is cooled and mixed with 10 ml. of 1 M boron hydride in tetrahydrofuran. The mixture is left at room temperature for one hour and heated in an oil bath at 170°–180° for two hours. The reaction mixture is cooled, 10 ml. of propionic acid is added and the mixture is again heated for two hours in an oil bath at 170°–180°. After cooling, the solvent is removed under reduced pressure and the residue is made strongly alkaline with dilute sodium hydroxide solution. The organic product is extracted into ether and chromatographed. Pure 1-(m-chlorophenyl)-3-(2-dimethylaminoethyl) - 2 - imidazolidinone is obtained.

EXAMPLE 31

*Preparation of 1-(m-chlorophenyl)-3-(3-dimethylaminopropyl)-2-imidazolinone hydrochloride*

Using the procedure of Example 10 and starting material 1-(3-dimethylaminopropyl) - 3 - (m - chlorophenyl)ureidoacetaldehyde diethylacetal (Example 9) the product obtained is 1-(m-chlorophenyl)-3-(3 - dimethylaminopropyl) - 2 - imidazolinone hydrochloride, melting point 138°–140° C.

EXAMPLE 32

*Preparation of 1-(2-dimethylaminoethyl)-3-phenyl-2-imidazolidinone hydrochloride*

A mixture of 2.7 parts of 1-(2-dimethylaminoethyl)-3-phenyl-2-imidazolinone hydrochloride, 100 parts of 85% ethanol and one part of 10% palladium-on-carbon catalyst is shaken in a Parr hydrogenator for 2 hours and filtered. The mother liquor is concentrated to remove the solvent and the residue is recrystallized from ethanol. The pure 1-(2-dimethylaminoethyl)-3-phenyl - 2 - imidazolidinone hydrochloride melts at 190°–191° C.

EXAMPLE 33

*Preparation of 1-(m-aminophenyl)-3-(2-dimethylaminoethyl)-2-imidazolidinone hydrochloride*

Following the procedure of Example 32 and using as starting material 1-(2 - dimethylaminoethyl)-3-(m-nitrophenyl)-2-imidazolinone hydrochloride (Example 21) the product, 1-(m-aminophenyl)-3-(2 - dimethylaminoethyl)-2-imidazolidinone hydrochloride, melting point 197°–199° C., is obtained.

EXAMPLE 34

*Preparation of 1-(3,4-dimethoxyphenyl)-3-(2-dimethylaminoethyl)-2-imidazolidinone hydrochloride*

When the procedure of Example 32 is followed and the starting material is 1-(3,4-dimethoxyphenyl) - 3 - (2-dimethylaminoethyl)-2 - imidazolinone hydrochloride (Example 24) the product obtained is 1-(3,4-dimethoxyphenyl)-3-(2 - dimethylaminoethyl)-2-imidazolidinone hydrochloride, melting point 177°–179° C.

EXAMPLE 35

*Preparation of 1-(2-dimethylaminoethyl)-3-(3,4,5-trimethoxyphenyl)-2-imidazolidinone hydrochloride*

When the procedure of Example 32 is followed and the starting material is 1-(2-dimethylaminoethyl)-3-(3,4,5-trimethoxyphenyl) - 2 - imidazolinone (Example 16) the product obtained is 1-(2-dimethylaminoethyl)-3-(3,4,5-trimethoxyphenyl)-2-imidazolidinone hydrochloride, melting point 200°–201° C.

EXAMPLE 36

*Preparation of 1-(2-dimethylaminoethyl)-3-(3,4-methylenedioxyphenyl)-2-imidazolidinone hydrochloride*

Using the procedure described in Example 32 and starting with the compound 1-(2-dimethylaminoethyl)-3-(3,4-methylenedioxyphenyl)-2 - imidazolidinone hydrochloride (Example 17) the product obtained is 1-(2-dimethylaminoethyl)-3-(3,4-methylenedioxyphenyl) - 2 - imidazolidinone hydrochloride, melting point 235°–237° C.

EXAMPLE 37

*Preparation of 1-(m-chlorophenyl)-3-(4-dimethylaminobutyl)-2-imidazolinone*

When the procedure of Example 10 is used and the starting material is 3-(m-chlorophenyl) - 1 - (4-dimethylaminobutyl)ureidoacetaldehyde diethylacetal, the product is 1-(m-chlorophenyl) - 3 - (4 - dimethylaminobutyl)-2-imidazolinone.

We claim:
1. A compound selected from those of the formula:

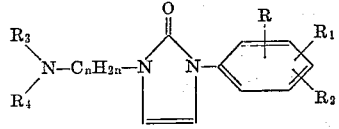

wherein R, $R_1$, and $R_2$ are members of the group consisting of hydrogen, halogen, lower alkyl, lower alkoxy, nitro and trifluoromethyl and $R_1$ and $R_2$ when on adjacent carbon atoms may represent the methylenedioxy group; $R_3$ and $R_4$ are members of the group consisting of lower alkyl, phenyl(lower)-alkyl, and when taken together with the nitrogen are pyrrolidino, lower alkylpyrrolidino, piperidino, lower alkylpiperidino, morpholino, lower alkyl morpholino, hexamethyleneimino, lower alkylpiperazinyl and phenylpiperazinyl; $n$ is an integer from 2 to 4 and an acid addition salt thereof.

2. A compound according to claim 1 in which R is halogen, $R_1$ and $R_2$ are hydrogen, $R_3$ and $R_4$ are lower alkyl and $n$ is 2.

3. The compound 3-(m-chlorophenyl)-1-(2-dimethylaminoethyl)-2-imidazolinone.

4. The compound 1-(2-dimethylaminoethyl)-3-phenyl-2-imidazolinone.

5. The compound 3-(p-chlorophenyl)-1-(2-dimethylaminoethyl)-2-imidazolinone.

6. The compound 1-(2-dimethylaminoethyl) - 3 - (p-fluorophenyl)-2-imidazolinone.

7. The compound 1-(2-dimethylaminoethyl) - 3 - (m-nitrophenyl)-2-imidazolinone.

8. The compound 1-(3,4-dimethoxyphenyl) - 3 - (2-dimethylaminoethyl)-2-imidazolinone.

9. The compound 1-(2-dimethylaminoethyl)-3-(3,4,5-trimethoxyphenyl)-2-imidazolinone.

10. The compound 1-(2 - dimethylaminoethyl)-3-(3,4-methylenedioxyphenyl)-2-imidazolinone.

11. The compound 1-(m-chlorophenyl)-3-(3-dimethylaminopropyl)-2-imidazolinone.

12. The compound 1-(m-chlorophenyl)-3-(4-dimethylaminobutyl)-2-imidazolinone.

References Cited

UNITED STATES PATENTS

| | | | |
|---|---|---|---|
| 2,707,186 | 4/1955 | Duschinsky | 260—309.6 |
| 3,133,079 | 5/1964 | Luckenbaugh | 260—309.6 |
| 3,136,776 | 6/1964 | Stoffel | 260—309.6 |
| 3,303,199 | 2/1967 | Doebel et al. | 260—309.6 |

WALTER A. MODANCE, *Primary Examiner.*

N. TROUSOF, *Assistant Examiner.*